(12) United States Patent
Zuo (10) Patent No.: US 10,491,949 B2
(45) Date of Patent: Nov. 26, 2019

(54) BULLET SCREEN POSTING METHOD AND MOBILE TERMINAL

(71) Applicant: TENCENT TECHNOLOGY (SHENZHEN) COMPANY LIMITED, Shenzhen (CN)

(72) Inventor: Hongtao Zuo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/465,685

(22) Filed: Mar. 22, 2017

(65) Prior Publication Data

US 2017/0195720 A1  Jul. 6, 2017

Related U.S. Application Data

(63) Continuation of application No. PCT/CN2016/078345, filed on Apr. 1, 2016.

(30) Foreign Application Priority Data

Apr. 13, 2015  (CN) .......................... 2015 1 0173999

(51) Int. Cl.
*H04N 21/44* (2011.01)
*H04N 21/422* (2011.01)
(Continued)

(52) U.S. Cl.
CPC . *H04N 21/44008* (2013.01); *H04N 21/41407* (2013.01); *H04N 21/42203* (2013.01);
(Continued)

(58) Field of Classification Search
CPC ....... H04N 21/41407; H04N 21/42203; H04N 21/4312; H04N 21/4316; H04N 21/44008;
(Continued)

(56) References Cited

U.S. PATENT DOCUMENTS

2004/0049388 A1   3/2004  Roth et al.
2005/0262542 A1*  11/2005 DeWeese ............ H04L 12/1818
                                                         725/106
(Continued)

FOREIGN PATENT DOCUMENTS

CN        1293427 A    5/2001
CN      102215233 A   10/2011
(Continued)

OTHER PUBLICATIONS

The World Intellectual Property Organization (WIPO) International Search Report for PCT/CN2016/078345 dated Jun. 24, 2016 5 Pages.
(Continued)

*Primary Examiner* — Rong Le
(74) *Attorney, Agent, or Firm* — Anova Law Group, PLLC (57) ABSTRACT

The present disclosure discloses a bullet screen posting method and apparatus, and belongs to the field of video playing technologies. The method includes: displaying a voice input button on a playing interface during a process of playing a video; receiving a press-and-hold signal acting on the voice input button; collecting voice information by using a microphone within duration of the press-and-hold signal; invoking a voice conversion module, and converting the voice information into text information by using the voice conversion module; and sending, by a video playing application, a bullet screen posting request to a background server, where the bullet screen posting request carries the text information. The method resolves a problem in the related technologies that when a user enters a comment in an input box, an input interface occupies an entire screen or occupies a large part of a screen, and normal watching of a video by the user is affected.

17 Claims, 6 Drawing Sheets

(51) Int. Cl.
*H04N 21/4402* (2011.01)
*H04N 21/431* (2011.01)
*H04N 21/472* (2011.01)
*H04N 21/475* (2011.01)
*H04N 21/414* (2011.01)
*H04N 21/81* (2011.01)

(52) U.S. Cl.
CPC ..... *H04N 21/4312* (2013.01); *H04N 21/4316* (2013.01); *H04N 21/440236* (2013.01); *H04N 21/472* (2013.01); *H04N 21/4758* (2013.01); *H04N 21/8133* (2013.01)

(58) Field of Classification Search
CPC ......... H04N 21/440236; H04N 21/472; H04N 21/4758; H04N 21/8133
See application file for complete search history.

(56) References Cited

U.S. PATENT DOCUMENTS

| | | | |
|---|---|---|---|
| 2008/0016526 A1* | 1/2008 | Asmussen | H04N 5/4401 725/34 |
| 2008/0046925 A1* | 2/2008 | Lee | G06F 17/30817 725/37 |
| 2008/0244681 A1* | 10/2008 | Gossweiler | H04N 21/235 725/133 |
| 2011/0313775 A1* | 12/2011 | Laligand | H04N 21/234336 704/275 |
| 2014/0317660 A1* | 10/2014 | Cheung | H04N 21/6175 725/44 |
| 2015/0256873 A1* | 9/2015 | Klein | H04N 21/26283 725/39 |
| 2015/0279369 A1* | 10/2015 | Lee | G06K 9/00288 704/275 |

FOREIGN PATENT DOCUMENTS

| | | |
|---|---|---|
| CN | 103631784 A | 3/2014 |
| CN | 103973544 A | 8/2014 |
| CN | 103997676 A | 8/2014 |
| CN | 103997688 A | 8/2014 |
| CN | 104010222 A | 8/2014 |
| CN | 104125483 A | 10/2014 |
| CN | 104125491 A | 10/2014 |
| CN | 104822093 A | 8/2015 |

OTHER PUBLICATIONS

The State Intellectual Property Office of the People's Republic of China (SIPO) Office Action 1 for 201510173999.4 dated Jun. 9, 2017 11 Pages (including translation).

* cited by examiner

BULLET SCREEN POSTING METHOD AND MOBILE TERMINAL

RELATED APPLICATION

This application claims priority to PCT Application No. PCT/CN2016/078345, filed on Apr. 1, 2016, which claims priority of Chinese Patent Application No. 201510173999.4, entitled "BULLET SCREEN POSTING METHOD AND APPARATUS." filed on Apr. 13, 2015. The two priority applications are both incorporated by reference in their entirety.

FIELD OF THE TECHNOLOGY

Embodiments of the present disclosure relate to the field of video playing technologies, and in particular, to a bullet screen posting method and a mobile terminal.

BACKGROUND OF THE DISCLOSURE

When a user watches a video with a mobile terminal, the user may make a comment on the video in a manner of a bullet screen. A bullet screen refers to an interaction manner in which a comment is displayed in a subtitle form on a video playing interface.

A related bullet screen posting method includes: during playing of a video, a mobile terminal receives a click signal of clicking a bullet screen posting button by a user. After receiving the click signal, the mobile terminal pauses playing of the video and jumps from the video playing interface to an input interface including a comment input box. The mobile terminal receives a comment entered by the user in the comment input box, and sends the received comment to a background server. The background server generates bullet screen information according to the received comment.

In a process of implementing embodiments of the present disclosure, the inventor finds that the foregoing technology has at least the following problem: During a process of posting a bullet screen, a mobile terminal jumps from a video playing interface to an input interface. Because the input box in the input interface occupies an entire screen or occupies a large part of a screen, the foregoing method may definitely affect normal watching of a video by the user.

SUMMARY

To resolve problems existing in the related technologies, embodiments of the present disclosure provide a bullet screen posting method and a mobile terminal. The technical solutions are as follows.

According to a first aspect, a bullet screen posting method is provided, the method including: displaying a voice input button on a playing interface during a process of playing a video by a video playing application; receiving, by the video playing application, a press-and-hold signal acting on the voice input button; collecting, by the video playing application, voice information by using a microphone within duration of the press-and-hold signal; invoking, by the video playing application, a voice conversion module, and converting the voice information into text information by using the voice conversion module; and sending, by the video playing application, a bullet screen posting request to a background server, the bullet screen posting request carrying the text information, and the bullet screen posting request being used for requesting the background server to post bullet screen information of the video according to the text information.

According to a second aspect, a bullet screen posting apparatus is provided, applied to a video playing application, the apparatus including: a first display module, configured to display a voice input button on a playing interface during a process of playing a video; a first receiving module, configured to receive a press-and-hold signal acting on the voice input button displayed by the first display module; an information collection module, configured to collect voice information by using a microphone within duration of the press-and-hold signal received by the first receiving module; a first conversion module, configured to invoke a voice conversion module, and convert the voice information into text information by using the voice conversion module; and an information sending module, configured to send a bullet screen posting request to a background server, the bullet screen posting request carrying the text information, and the bullet screen posting request being used for requesting the background server to post bullet screen information of the video according to the text information.

According to a third aspect, a mobile terminal is provided, a video playing application running on the mobile terminal, the mobile terminal including: one or more processors; and a memory, the memory storing one or more programs, the one or more programs being configured to be executed by the one or more processor, and the one or more programs including an instruction used for performing the following operations: displaying a voice input button on a playing interface during a process of playing a video by a video playing application; receiving a press-and-hold signal acting on the voice input button; collecting voice information by using a microphone within duration of the press-and-hold signal; invoking a voice conversion module, and converting the voice information into text information by using the voice conversion module; and sending a bullet screen posting request to a background server, the bullet screen posting request carrying the text information, and the bullet screen posting request being used for requesting the background server to post bullet screen information of the video according to the text information.

The technical solutions provided in the embodiments of the present disclosure have the following beneficial effects.

A voice input button is displayed on a playing interface, and a user inputs voice information by pressing the voice input button to further post a bullet screen by using the voice information, so as to resolve a problem in the related technologies that when a user enters a comment in an input box, an input interface occupies an entire screen or occupies a large part of a screen, and normal watching of a video by the user is affected, thereby achieving an effect that when a user inputs voice information, that is, posts a bullet screen, a video playing application can still normally play a video, and normal watching of the user is not affected.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the embodiments of the present disclosure in detail with reference to the accompanying drawings.

A video playing application may run in a mobile terminal, and the mobile terminal may be a terminal such as a mobile phone, a tablet computer, or an electronic reader. The mobile terminal may have a voice receiving capability, and may be connected to a background server by using a wired or wireless network.

The video playing application refers to an application having a capability of obtaining a video stream from the background server. The video stream is a video stream of a video on demand, or a video stream of a live video. For example, the video playing application may be an "xx video", and a user may request a video from the background server by using the "xx video". Generally, the user may log in to the video playing application on the mobile terminal by using an account, and post bullet screen information of a video by using the account. Moreover, the user may obtain, from the background server, bullet screen information, posted by other users by using accounts of the video playing application, of the video.

Figure 1:
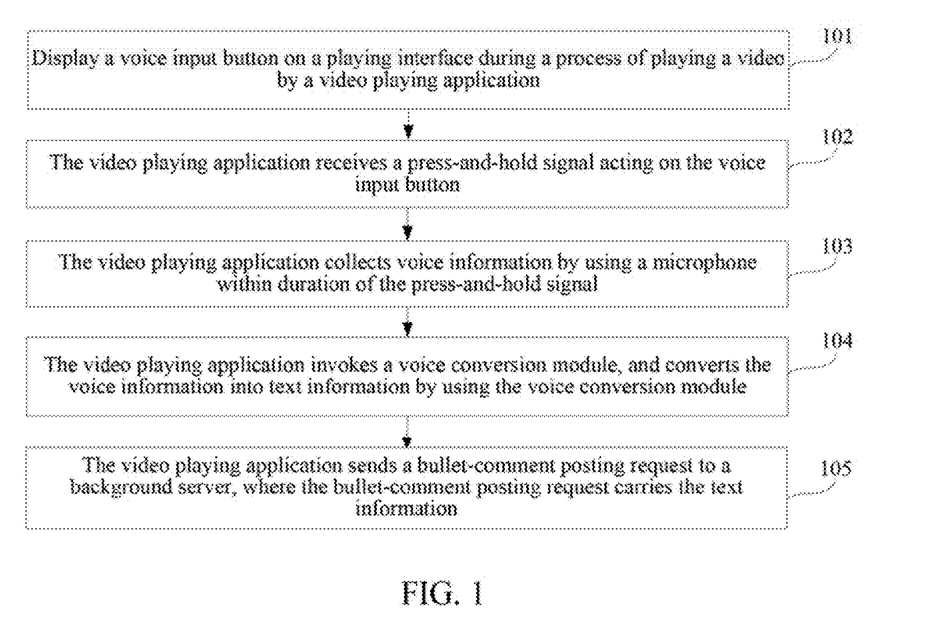
FIG. 1 is a flowchart of a bullet screen posting method according to an embodiment of the present disclosure.

Referring to FIG. 1, FIG. 1 is a flowchart of a bullet screen posting method according to an embodiment of the present disclosure. As shown in FIG. 1, the bullet screen posting method includes:

Step 101: Display a voice input button on a playing interface during a process of playing a video by a video playing application.

Step 102: The video playing application receives a press-and-hold signal acting on the voice input button.

Step 103: The video playing application collects voice information by using a microphone within duration of the press-and-hold signal.

Step 104: The video playing application invokes a voice conversion module, and converts the voice information into text information by using the voice conversion module.

Step 105: The video playing application sends a bullet screen posting request to a background server, where the bullet screen posting request carries the text information.

The bullet screen posting request is used for requesting the background server to post bullet screen information of the video according to the text information.

In conclusion, in the bullet screen posting method provided in this embodiment, a voice input button is displayed on a playing interface, and a user inputs voice information by pressing the voice input button to further post a bullet screen by using the voice information, so as to resolve a problem in the related technologies that when a user enters a comment in an input box, an input interface occupies an entire screen or occupies a large part of a screen, and normal watching of a video by the user is affected, thereby achieving an effect that when a user inputs voice information, that is, posts a bullet screen, a video playing application can still normally play a video, and normal watching of the user is not affected.

In this embodiment, the bullet screen information is posted by using voice information, so that a user does not need to manually enter a comment by using a mobile terminal, thereby lowering a literacy requirement of a user. In particular, this also avoids a problem that when a user manually enters a comment, the user may easily make an input error because of a relatively small screen of a mobile terminal, thereby improving input accuracy.

Figure 2A:
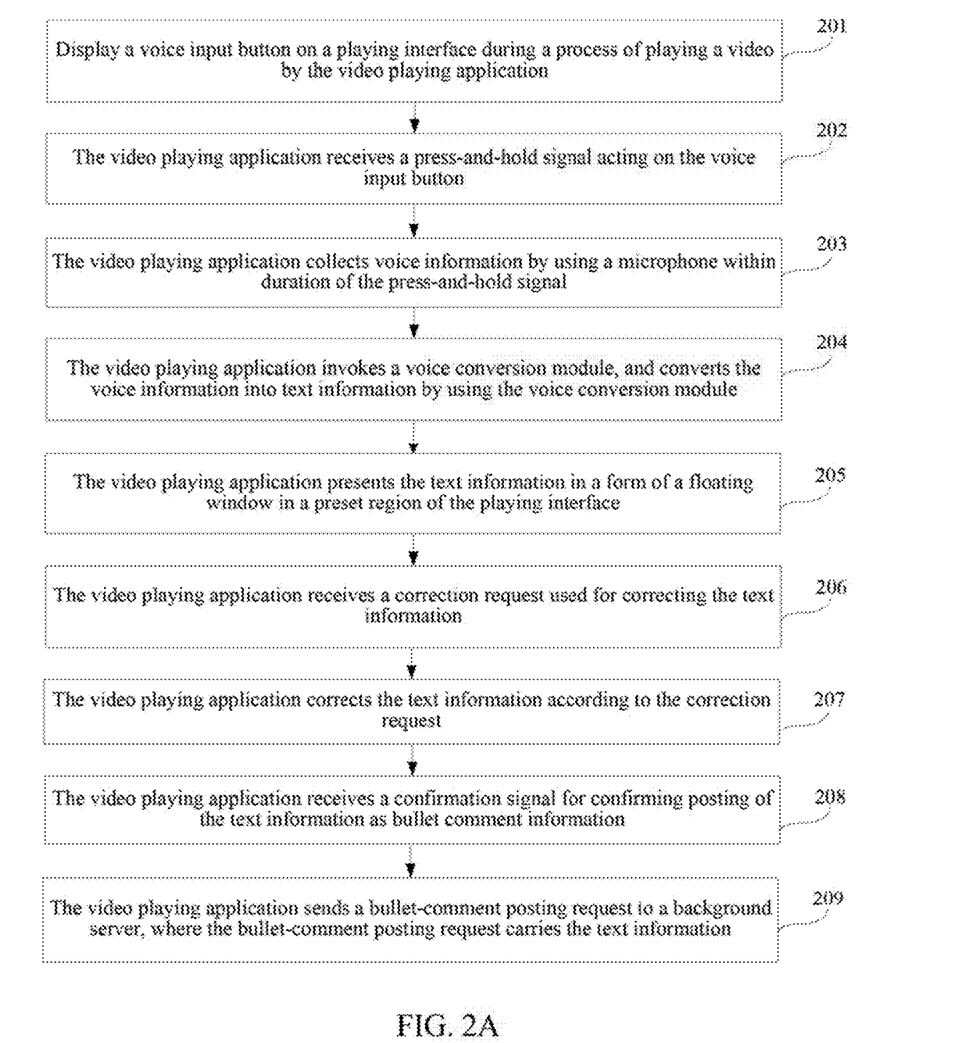
FIG. 2A is a flowchart of a bullet screen posting method according to another embodiment of the present disclosure.

Referring to FIG. 2A, FIG. 2A is a flowchart of a bullet screen posting method according to another embodiment of the present disclosure. As shown in FIG. 2A, the bullet screen posting method includes:

Step 201: Display a voice input button on a playing interface during a process of playing a video by the video playing application.

The video playing application refers to an application client that is installed in the mobile terminal and is used for playing a video. During a process of playing a video by the video playing application, the playing interface may display the voice input button, where the voice input button is a button for triggering voice input. A user may trigger input of voice information by pressing the voice input button. For example, referring to FIG. 2B, the video playing application may display the voice input button 21.

Figure 2B:
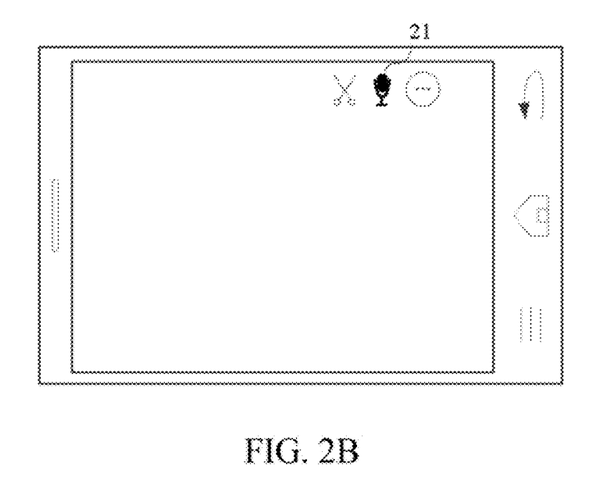
FIG. 2B is a presentation schematic diagram of presenting a voice input button by a video playing application according to another embodiment of the present disclosure.

Optionally, the playing interface may constantly display the voice input button, or may also display the voice input button after the user clicks any position in the playing interface, and this embodiment is not limited thereto. The voice input button may be displayed in any position of the video playing interface. Moreover, in order not to affect normal watching of a video by the user, the voice input button may be displayed in a display region for displaying all control buttons in the playing interface. For example, the voice input button may be displayed in a row together with a pause button, a fast forward button, and a rewind button in the display region. Alternatively, the voice input button may be presented in a position of a non-video displaying region in the playing interface. For example, the voice input button is displayed in an advertisement region of the playing interface. Meanwhile, in order not to affect normal watching of a video by the user, the voice input button may further be a button with a display size less than a preset threshold. The preset threshold may be 1/100 of a total size of the playing interface, where the display size refers to a screen size occupied by the voice input button when the mobile terminal displays the voice input button. Optionally, at the same time when the playing interface displays the voice input button, the playing interface may also display a button such as a screenshot button or a menu button (the user may adjust a display proportion of the playing interface and share the video by using the menu button), and this embodiment is not limited thereto.

Step 202: The video playing application receives a press-and-hold signal acting on the voice input button.

When a user wants to post feelings about a video by using a bullet screen at a current moment, the user may press and hold the voice input button displayed in the video playing application. Correspondingly, the video playing application may receive the press-and-hold signal acting on the voice input button. For example, the user presses and holds the voice input button for 3 s, and the video playing application may correspondingly receive a press-and-hold signal of pressing and holding the voice input button for 3 s.

Step 203: The video playing application collects voice information by using a microphone within duration of the press-and-hold signal.

Within the duration of the press-and-hold signal, the video playing application may invoke the microphone in the mobile terminal, and collect the voice information in an environment by using the microphone.

Step 204: The video playing application invokes a voice conversion module, and converts the voice information into text information by using the voice conversion module.

After collecting the voice information, the video playing application may invoke the voice conversion module, and convert the voice information into the text information by using the voice conversion module. The voice conversion module may be a conversion module in the mobile terminal, or may be a conversion module in a server.

When the voice conversion module is a conversion module in the mobile terminal, the step of invoking, by the video playing application, the voice conversion module may include that: after the video playing application collects voice information, directly invoking, by the video playing application, the voice conversion module in the mobile terminal, and converting the voice information into the text information by using the voice conversion module.

When the voice conversion module is a conversion module in the server, the step of invoking, by the video playing application, the voice conversion module may include that: sending, by the video playing application, a voice conversion request to the server, where the voice conversion request carries voice information; after the sever receives the voice conversion request, converting, by the server, the voice information carried in the voice conversion request by using the voice conversion module in the server, and returning text information obtained through conversion to the video playing application.

Step 205: The video playing application presents the text information in a form of a floating window in a preset region of the playing interface.

To provide a user with a function of previewing the text information corresponding to the voice information, the video playing application may present the text information in a form of a floating window in a preset region of the playing interface. The preset region is at least one of the bottom of the playing interface, the top of the playing interface, a left side of the playing interface, a right side of the playing interface, and a central region of the playing interface. The floating window refers to a window displayed above the playing interface. Generally, during display of the floating window, content blocked by a floating window in the playing interface is in a state that the content cannot be triggered.

Figure 2C:
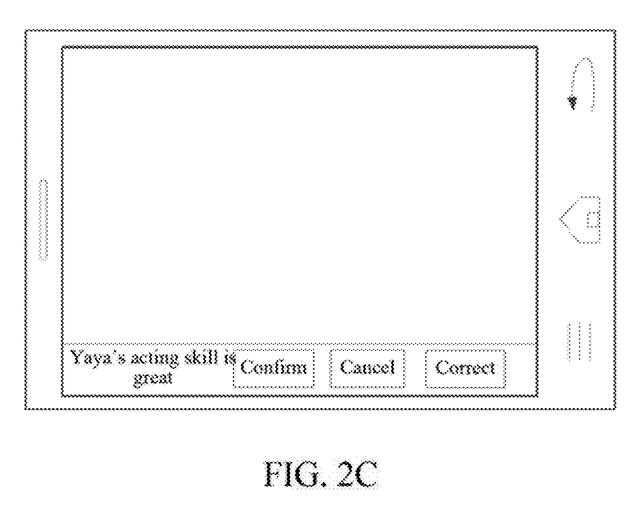
FIG. 2C is a presentation schematic diagram of presenting text information by a video playing application according to another embodiment of the present disclosure.

For example, an example in which the preset region is the bottom of the playing interface is used, and the video playing application may present the text information by using an interface shown in FIG. 2C.

An example in which the video playing application presents the text information in a form of a floating window is used in this embodiment. Optionally, the video playing application may further present the text information in a form of subtitles, and this embodiment is not limited thereto.

Step 206: The video playing application receives a correction request used for correcting the text information.

After the video playing application presents the text information, when a user finds an error in the text information, the user may request to correct the text information. Correspondingly, the video playing application may receive the correction request used for correcting the text information.

Optionally, at the same time when the video playing application presents the text information, the video playing application may further present a correction option, for example, present a correction button shown in FIG. 2C, used for correcting the text information. When the user wants to correct the text information, the user clicks the correction option.

Step 207: The video playing application corrects the text information according to the correction request.

After the video playing application receives the correction request, the video playing application may correct the text information according to the correction request.

Optionally, this step may include either of the following two possible implementation manners.

As a possible implementation manner, this step may include:

(1) The video playing application receives a selection signal for selecting target content in the text information.

When the voice conversion module performs voice conversion, the voice conversion module may make a conversion error for homophones. Therefore, to correct a word that is incorrectly converted, when the video playing application presents the text information and the user finds an error in the target content of the presented text information, the user may select the target content. Correspondingly, the video playing application may receive a selection signal for selecting the target content.

It should be noted that only an example in which the correction request is first received and the selection signal is then received is used in this embodiment. Optionally, the user may further directly select the target content in the text information, and further request to correct the target content. That is, the correction request may be the selection signal for selecting the target content, and this embodiment is not limited thereto. Moreover, in this case, the video playing application may not present the correction button.

(2) The video playing application presents a homophonic candidate of the target content.

After receiving the selection signal, the video playing application may display a homophonic candidate of the target content. Optionally, the video playing application may present a predetermined quantity of candidates, and the user may view more candidates through page turning.

Figure 2D:
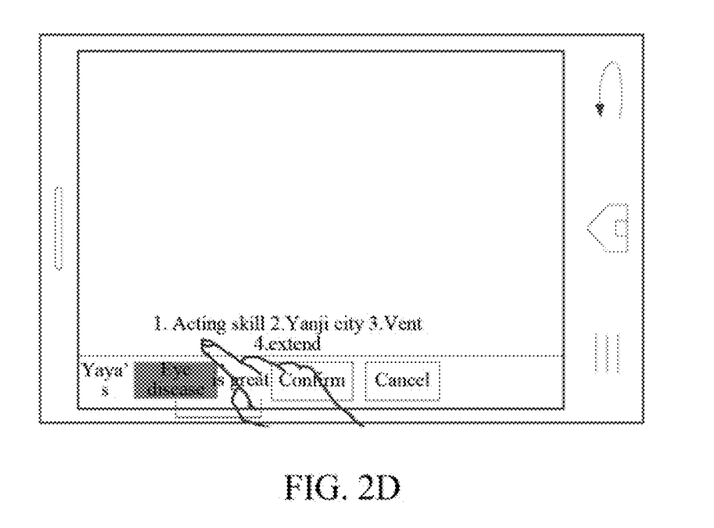
FIG. 2D is a presentation schematic diagram of a video playing application when a user corrects text information according to another embodiment of the present disclosure.

For example, referring to FIG. 2D, when the user finds that "eye disease" (pronounced as "yanji") in the text information is incorrect, after the user selects "eye disease", the video playing application may present candidates with words with the same pronunciation "yanji" that are shown in FIG. 2D.

(3) The video playing application receives a selection signal for selecting a candidate.

The user selects, from the candidates presented by the video playing application, a candidate that the user wants to use. Optionally, when the candidates presented by the video playing application do not include the desired candidate, the user may trigger, through page turning, the video playing application to display more candidates, and this embodiment is not limited thereto.

(4) The video playing application replaces the target content with the candidate selected by using the selection signal.

After receiving the selection signal, the video playing application may replace the target content with the candidate selected by using the selection signal. For example, in FIG. 2D, when the user selects "acting skill" (pronounced "yanji"), the video playing application may replace "eye disease" with "acting skill", and display text information "Yaya's acting skill is great" after the replacement.

As another possible implementation manner, this step may include:

(1) The video playing application invokes the voice conversion module again, and uses the voice conversion module to convert the voice information into the text information again by using another conversion rule different from a conversion rule used in historical conversion.

Multiple sets of voice conversion rules are generally set in the voice conversion module. Therefore, when the user finds that the text information presented by the video playing application is incorrect, the video playing application may invoke the voice conversion module again, and convert the voice information into the text information again by using the voice conversion module. When the voice conversion module converts the voice information again, the conversion rule used by the voice conversion module is different from a conversion rule used before.

Optionally, when the voice conversion module is a voice conversion module in the server, the video playing application may send a conversion request to the server, where the conversion request carries the presented text information and voice information. After receiving the conversion request, the server converts the voice information again by using the voice conversion module and by using another conversion rule different from the conversion rule corresponding to the text information in the conversion request, and returns the text information obtained through conversion to the video playing application.

(2) The video playing application replaces the presented text information with the text information obtained through another time of conversion.

When the video playing application obtains the text information obtained through another time of conversion, the video playing application may replace the presented text information with the text information obtained through another time of conversion.

Step 208: The video playing application receives a confirmation signal for confirming posting of the text information as bullet screen information.

When the user confirms that the text information presented by the video playing application is correct and further wants to post a bullet screen, the user may send the confirmation signal for confirming posting of the text information as the bullet screen information. Correspondingly, the video playing application may receive the confirmation signal.

Optionally, this step may include at least one of the following two possible implementation manners.

As a first possible implementation manner, this step may include: receiving, by the video playing application, a voice confirmation instruction.

The user may control, by using a voice instruction, the video playing application to post the text information, and in this case, the video playing application may correspondingly receive a voice confirmation instruction. For example, when the user confirms that the text information presented by the video playing application is correct, the user may say "post" into a microphone of a mobile terminal, and correspondingly, the mobile terminal may receive "post" said by the user.

As a second possible implementation manner, at the same time when the video playing application presents the text information, the video playing application presents a confirmation option for confirming posting of the text information; and the video playing application receives a selection signal for selecting the confirmation option.

At the same time when the video playing application presents the text information, the video playing application may further present a confirmation option for confirming posting of the text information, where the confirmation option is, for example, a confirmation button shown in FIG. 2C. When the user selects the confirmation option, the video playing application may receive a selection signal for selecting the confirmation option, and confirms the received selection signal as a confirmation signal.

It should be noted that at the same time when the video playing application presents the text information, the video playing application may further present a cancel option for canceling posting of the text information, where the cancel option is, for example, a cancel button shown in FIG. 2C. When the user wants to give up the current time of posting, the user may select the cancel option. Correspondingly, after receiving the selection signal, the video playing application ends this procedure.

Step 209: The video playing application sends a bullet screen posting request to a background server, where the bullet screen posting request carries the text information.

Optionally, before sending the text information to the background server, the video playing application may further obtain a playing progress of the video, so as to further send the bullet screen posting request carrying the playing progress and the text information to the background server. The bullet screen posting request is used for requesting the background server to post the bullet screen information of the video according to the playing progress and the text information. The playing progress may be a progress corresponding to a start moment of the press-and-hold signal received by the video playing application, or a progress corresponding an end moment of the press-and-hold signal.

For example, an example in which the playing progress is the progress corresponding to the start moment is used. When the user watches a video and Yaya appears in the video, the user presses and holds the voice input button in the video playing interface and says "Yaya's acting skill is great". In this case, the video playing application may obtain a playing progress of the video at a start moment when a press-and-hold signal is received, where the start moment is, for example, 10:20. After obtaining the text information corresponding to the voice information through conversion, the video playing application sends the obtained playing progress and text information to the background server. The background server generates the bullet screen information according to the playing progress and the text information. Later, when another user watches the video, the other user may see the bullet screen "Yaya's acting skill is great" at 10:20.

Optionally, only an example in which the video playing application sends the bullet screen posting request carrying the playing progress and the text information to the background server and the background server posts the bullet screen information is used for description. Optionally, after obtaining the playing progress and the text information, the video playing application may further directly generate the bullet screen information, and send the generated bullet screen information to the background server, and this embodiment is not limited thereto.

In addition, when the video is a live video and subsequently a video-on-demand service does not need to be provided for the video, the video playing application may further directly send the text information to the background server, and the background server generates the bullet screen information in real time and displays the bullet screen information in real time on a playing interface of the video playing application of another user who watches the video live.

It should be noted that in step 204, when the voice conversion module fails to convert the voice information, the video playing application may present prompt information for prompting the user that conversion fails.

It should be further noted that step 205 and step 208 are optional steps. During actual implementation, after obtaining the text information through conversion, the video playing application may directly send the text information to the background server.

It should be still further noted that step 206 and step 207 are optional steps, that is, when the user finds that the presented text information is correct and wants to directly post the text information, under the control of the user, the video playing application may skip step 206 and step 207. Alternatively, when the user wants to give up the current time of posting, under the control of the user, the video playing application may skip step 206 and step 207.

In conclusion, in the bullet screen posting method provided in this embodiment, a voice input button is displayed on a playing interface, and a user inputs voice information by pressing the voice input button to further post a bullet screen by using the voice information, so as to resolve a problem in the related technologies that when a user enters a comment in an input box, an input interface occupies an entire screen or occupies a large part of a screen, and normal watching of a video by the user is affected, thereby achieving an effect that when a user inputs voice information, that is, posts a bullet screen, a video playing application can still normally play a video, and normal watching of the user is not affected.

In this embodiment, the bullet screen information is posted by using voice information, so that a user does not need to manually enter a comment by using a mobile terminal, thereby lowering a literacy requirement of a user. In particular, this also avoids a problem that when a user manually enters a comment, the user may easily make an input error because of a relatively small screen of a mobile terminal, thereby improving input accuracy.

After the video playing application obtains the text information, the video playing application may present the text information and provide a user with a function of previewing the text information, so as to enable the user to select, according to a requirement of the user, to post the text information or give up posting of the text information. In addition, after the text information is presented, the user may further correct the text information, thereby avoiding a problem that the posted bullet screen information is incorrect because the text information obtained through conversion by using the voice conversion module is incorrect, and improving the accuracy of a bullet screen.

It should be further noted that within duration of the press-and-hold signal, the video playing application pauses playing of the video.

This step may include the following two possible implementation manners.

As a first possible implementation manner, during a process of receiving the press-and-hold signal by the video playing application, the video playing application may collect the voice information in the environment by using the microphone. Therefore, to avoid interference from audio information in the video, the video playing application may pause playing of the audio information in the video.

As a second possible implementation manner, the video playing application may directly pause playing of the video.

It should be further noted that if within duration of the press-and-hold signal, the video playing application pauses playing of the video, after the press-and-hold signal ends, the video playing application may continue to play the video.

Figure 3:
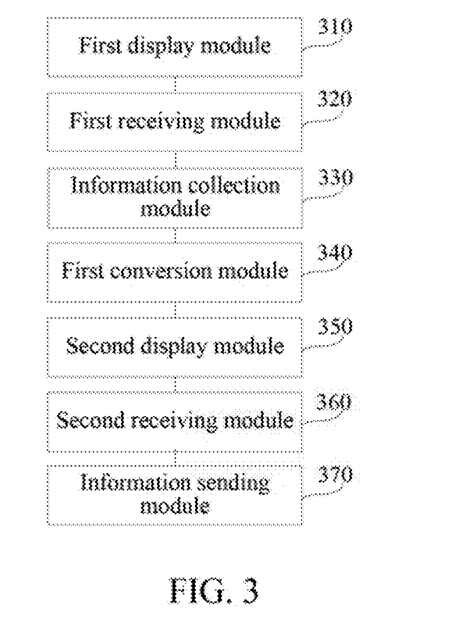
FIG. 3 is a schematic structural diagram of a bullet screen posting apparatus according to an embodiment of the present disclosure.

Referring to FIG. 3, FIG. 3 is a schematic structural diagram of a bullet screen posting apparatus according to an embodiment of the present disclosure, where the bullet screen posting apparatus is applied to a video playing application. As shown in FIG. 3, the bullet screen posting apparatus may include: a first display module 310, a first receiving module 320, an information collection module 330, a first conversion module 340, a second display module 350, a second receiving module 360, and an information sending module 370.

The first display module 310 is configured to display a voice input button on a playing interface during a process of playing a video.

The first receiving module 320 is configured to receive a press-and-hold signal acting on the voice input button displayed by the first display module 310.

The information collection module 330 is configured to collect voice information by using a microphone within duration of the press-and-hold signal received by the first receiving module 320.

The first conversion module 340 is configured to invoke a voice conversion module, and convert the voice information into text information by using the voice conversion module.

The second display module 350 is configured to present the text information in a form of a floating window on the playing interface.

The second receiving module 360 is configured to receive a confirmation signal for confirming posting of the text information as bullet screen information.

The information sending module 370 is configured to send the text information to a background server, where the background server is configured to generate bullet screen information of the video according to the text information.

In conclusion, in the bullet screen posting apparatus provided in this embodiment, a voice input button is displayed on a playing interface, and a user inputs voice information by pressing the voice input button to further post a bullet screen by using the voice information, so as to resolve a problem in the related technologies that when a user enters a comment in an input box, an input interface occupies an entire screen or occupies a large part of a screen, and normal watching of a video by the user is affected, thereby achieving an effect that when a user inputs voice information, that is, posts a bullet screen, a video playing application can still normally play a video, and normal watching of the user is not affected.

In this embodiment, the bullet screen information is posted by using voice information, so that a user does not need to manually enter a comment by using a mobile terminal, thereby lowering a literacy requirement of a user. In particular, this also avoids a problem that when a user manually enters a comment, the user may easily make an input error because of a relatively small screen of a mobile terminal, thereby improving input accuracy.

Figure 4:
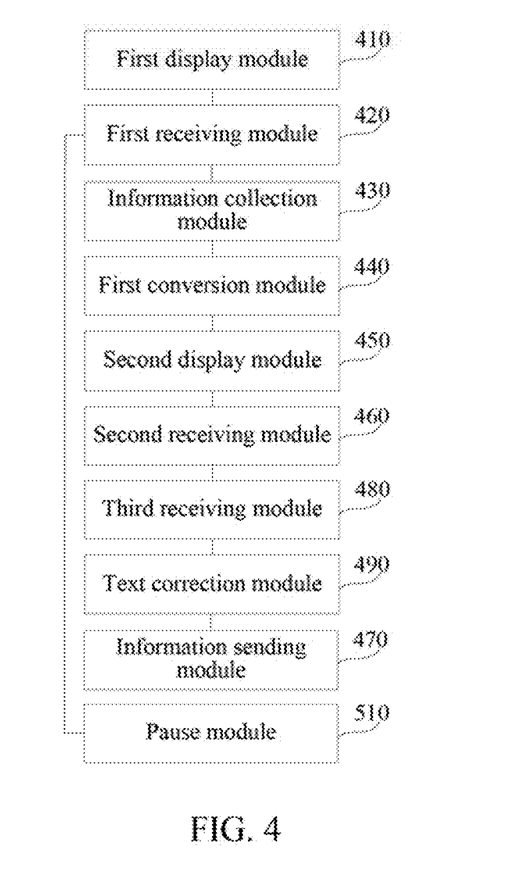
FIG. 4 is a schematic structural diagram of a bullet screen posting apparatus according to another embodiment of the present disclosure.

Referring to FIG. 4, FIG. 4 is a schematic structural diagram of a bullet screen posting apparatus according to another embodiment of the present disclosure, where the bullet screen posting apparatus is applied to a video playing application. As shown in FIG. 4, the bullet screen posting apparatus may include: a first display module 410, a first receiving module 420, an information collection module 430, a first conversion module 440, a second display module 450, a second receiving module 460, and an information sending module 470.

The first display module 410 is configured to display a voice input button on a playing interface during a process of playing a video.

The first receiving module 420 is configured to receive a press-and-hold signal acting on the voice input button displayed by the first display module 410.

The information collection module 430 is configured to collect voice information by using a microphone within duration of the press-and-hold signal received by the first receiving module 420.

The first conversion module 440 is configured to invoke a voice conversion module, and convert the voice information into text information by using the voice conversion module.

The second display module 450 is configured to present the text information in a form of a floating window on the playing interface.

The second receiving module 460 is configured to receive a confirmation signal for confirming posting of the text information as bullet screen information.

The information sending module 470 is configured to send the text information to a background server, where the background server is configured to generate bullet screen information of the video according to the text information.

Optionally, the second receiving module 460 is further configured to: receive a voice confirmation instruction; or, present a confirmation option for confirming posting of the text information at the same time when the text information is presented; and receive a selection signal for selecting the confirmation option.

Optionally, the apparatus further includes: a third receiving module 480, configured to receive a correction request used for correcting the text information; and a text correction module 490, configured to correct the text information according to the correction request received by the third receiving module 480.

Optionally, the text correction module 490 is further configured to: receive a selection signal for selecting target content in the text information; present a homophonic candidate of the target content; receive a selection signal for selecting a candidate; and replace the target content with the candidate selected by using the selection signal.

Optionally, the text correction module 490 is further configured to: invoke the voice conversion module again, and convert the voice information into the text information again by using the voice conversion module and by using another conversion rule different from a conversion rule used in historical conversion; and replace the presented text information with the text information obtained through another time of conversion by using the conversion module.

Optionally, the second display module 450 is further configured to present the text information in a form of a floating window in a preset region of the playing interface, where the preset region is at least one of the bottom of the playing interface, the top of the playing interface, a left side of the playing interface, a right side of the playing interface, and a central region of the playing interface.

Optionally, the apparatus further includes: a pause module 510, configured to pause playing of the video within duration of the press-and-hold signal.

Optionally, the pause module 510 is further configured to: pause playing of audio information in the video; or, pause playing of the video.

In conclusion, in the bullet screen posting apparatus provided in this embodiment, a voice input button is displayed on a playing interface, and a user inputs voice information by pressing the voice input button to further post a bullet screen by using the voice information, so as to resolve a problem in the related technologies that when a user enters a comment in an input box, an input interface occupies an entire screen or occupies a large part of a screen, and normal watching of a video by the user is affected, thereby achieving an effect that when a user inputs voice information, that is, posts a bullet screen, a video playing application can still normally play a video, and normal watching of the user is not affected.

In this embodiment, the bullet screen information is posted by using voice information, so that a user does not need to manually enter a comment by using a mobile terminal, thereby lowering a literacy requirement of a user. In particular, this also avoids a problem that when a user manually enters a comment, the user may easily make an input error because of a relatively small screen of a mobile terminal, thereby improving input accuracy.

After the video playing application obtains the text information, the video playing application may present the text information and provide a user with a function of previewing the text information, so as to enable the user to select, according to a requirement of the user, to post the text information or give up posting of the text information. In addition, after the text information is presented, the user may further correct the text information, thereby avoiding a problem that the posted bullet screen information is incorrect because the text information obtained through conversion by using the voice conversion module is incorrect, and improving the accuracy of a bullet screen.

Figure 5:
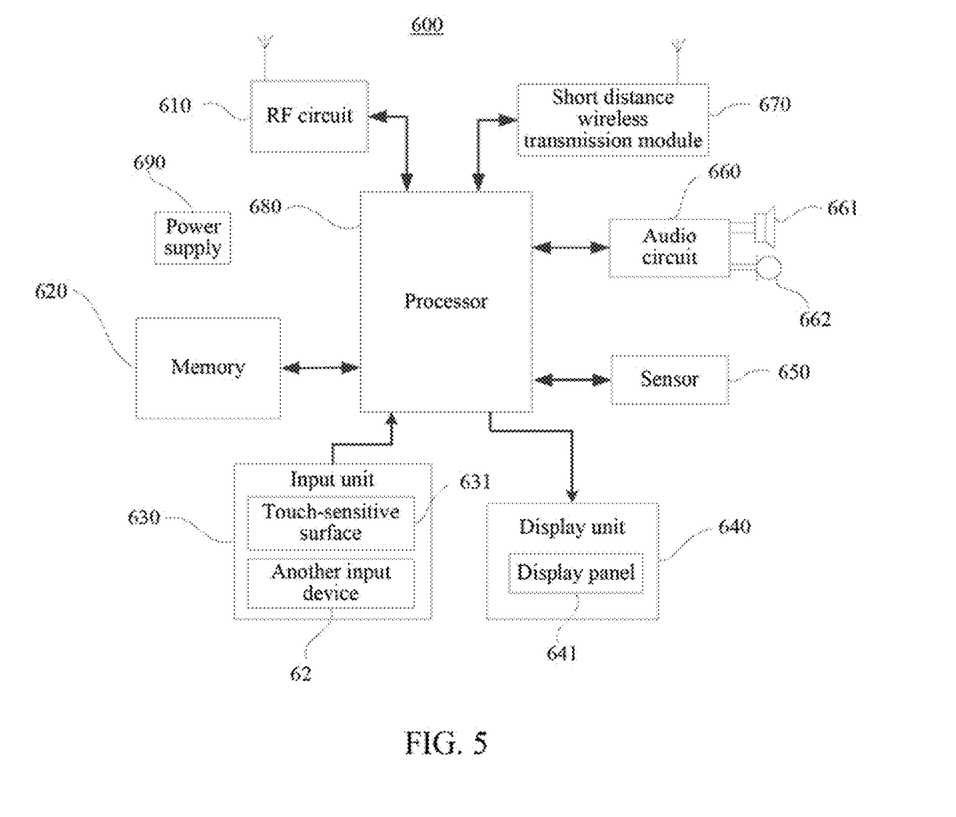
FIG. 5 is a schematic structural diagram of a mobile terminal according to an embodiment of the present disclosure.

FIG. 5 is a schematic structural diagram of a mobile terminal according to an embodiment of the present disclosure. A video playing application may run on the mobile terminal 600. Specifically:

The mobile terminal 600 may include components such as a radio frequency (RF) circuit 610, a memory 620 including one or more computer readable storage media, an input unit 630, a display unit 640, a sensor 650, an audio circuit 660, a short distance wireless transmission module 670, a processor 680 including one or more processing cores, and a power supply 6390. A person skilled in the art may understand that the structure of the mobile terminal shown in FIG. 5 does not constitute a limitation to the mobile terminal. The mobile terminal may include more components or fewer components than those shown in the figure, or some components may be combined, or a different arrangement of components may be used.

The RF circuit 610 may be configured to receive and send signals during an information receiving and sending process or a calling process. Particularly, the RF circuit 610 receives downlink information from a base station, and then delivers the downlink information to one or more processors 680 for processing, and sends related uplink data to the base station. Generally, the RF circuit 610 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 610 may also communicate with a network and another device by using wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like. The memory 620 may be configured to store software programs and modules. For example, the memory 620 may be configured to store a preset time list, may be further configured to store a software program for collecting a voice signal, a software program implementing keyword recognition, a software program implementing continuous voice recognition, and a software program implementing setting of a reminder item, and may be further configured to store a binding relationship between a wireless access point and a user account. The processor 680 runs the software programs and modules stored in the memory 620, to implement various functional applications and data processing. The memory 620 may mainly include a program storage area and a data storage area, where the program storage area may store an operating system and an application program required by at least one function (for example, a video playing function, an image displaying function, and a touch screen recognition function), and the data storage area may store data created according to use of the mobile terminal 600 or other data. In addition, the memory 620 may include a high speed random access memory (RAM), and may also include a non-volatile memory such as at least one magnetic disk storage device, a flash memory device, or another volatile solid-state storage device. Correspondingly, the memory 620 may further include a memory controller, so as to provide access to the memory 620 by the processor 680 and the input unit 630.

The input unit 630 may be configured to receive input digit or character information, and generate a signal input, related to a user setting and function control, of a keyboard, a mouse, a joystick, an optical or trackball. Specifically, the input unit 630 may include a touch-sensitive surface 631 and another input device 632. The touch-sensitive surface 631, which may also be referred to as a touch display screen or a touch control panel, may collect a touch operation of a user on or near the touch-sensitive surface 631 (such as an operation of a user on or near the touch-sensitive surface 631 by using any suitable object or accessory such as a finger or a stylus), and drive a corresponding connection apparatus according to a preset program. Optionally, the touch-sensitive surface 631 may include two parts: a touch detection apparatus and a touch controller. The touch detection apparatus detects a touch position of the user, detects a signal generated by the touch operation, and transfers the signal to the touch controller. The touch controller receives touch signal from the touch detection apparatus, converts the touch information into touch point coordinates, and sends the touch point coordinates to the processor 680. Moreover, the touch controller can receive and execute a command sent from the processor 680. In addition, the touch-sensitive surface 631 may be a resistive, capacitive, infrared, or surface acoustic wave touch-sensitive surface 631. In addition to the touch-sensitive surface 631, the input unit 630 may further include another input device 632. Specifically, the another input device 632 may include, but is not limited to, one or more of a physical keyboard, a functional key (such as a volume control key and a switch key), a trackball, a mouse, and a joystick.

The display unit 640 may be configured to display information input by the user or information provided to the user, and various graphical user interfaces of the mobile terminal 600, where these graphical user interface may be composed of a graphic, a text, an icon, a video, and any combination thereof. The display unit 640 may include a display panel 641. Optionally, the display panel 641 may be configured by using a liquid crystal display (LCD), an organic light-emitting diode (OLED), or the like. Further, the touch-sensitive surface 631 may cover the display panel 641. After detecting a touch operation on or near the touch-sensitive surface 631, the touch-sensitive surface 631 sends the touch operation to the processor 680, so as to determine a type of a touch event. Then, the processor 680 provides a corresponding visual output on the display panel 641 according to the type of the touch event. In FIG. 5, the touch-sensitive surface 631 and the display panel 641 are used as two separate parts to implement input and output functions. However, in some embodiment, the touch-sensitive surface 631 and the display panel 641 may be integrated to implement the input and output functions.

The mobile terminal 600 may further include at least one sensor 650 such as an optical sensor, a motion sensor, and other sensors. Specifically, the optical sensor may include an ambient light sensor and a proximity sensor, where the ambient light sensor may adjust luminance of the display panel 641 according to brightness of the ambient light, and the proximity sensor may switch off the display panel 641 and/or backlight when the mobile terminal 600 is moved near the ear. As one type of motion sensor, a gravity acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), and a function related to vibration recognition (such as a pedometer and a knock), and the like. Other sensors such as a gyroscope, a barometer, a hygrometer, a thermometer, and an infrared sensor that may be configured in the mobile terminal 600 are not further described herein.

The audio circuit 660, a loudspeaker 661, and a microphone 662 may provide audio interfaces between the user and the mobile terminal 600. The audio circuit 660 may convert received audio data into an electric signal and transmit the electric signal to the loudspeaker 661. The loudspeaker 661 converts the electric signal into a sound signal and output the sound signal. In another aspect, the microphone 662 converts a collected sound signal into an electric signal. The audio circuit 660 receives the electric signal, converts the electric signal into audio data, and outputs the audio data to the processor 680 for processing. Then, the processor 680 sends the audio data to another mobile terminal by using the RF circuit 610, or outputs the audio data to the memory 620 for further processing. The audio circuit 660 may further include an earplug jack for providing communication between a peripheral earphone and the mobile terminal 600.

The short distance wireless transmission module 670 may be a wireless fidelity (WiFi) module or a Bluetooth module. The mobile terminal 600 may help, by using the short distance wireless transmission module 670, a user to receive and send e-mails, browse a webpage, and access streaming media, and so on, which provides the user with wireless broadband Internet access. Although FIG. 5 shows the short distance wireless transmission module 670, it may be understood that the short distance wireless transmission module 670 is not an essential component of the mobile terminal 600, and when required, the short distance wireless transmission module 670 may be omitted as long as the scope of the essence of the present disclosure is not changed.

The processor 680 is a control center of the mobile terminal 600, and is connected to various parts of the entire mobile terminal by using various interfaces and lines. By running or executing the software programs and/or modules that are stored in the memory 620, and invoking data stored in the memory 620, the processor 680 performs various functions and data processing of the mobile terminal 699, thereby performing overall monitoring on the mobile terminal. Optionally, the processor 680 may include one or more processing cores. Optionally, the processor 680 may integrate an application processor and a modem. The application processor mainly processes an operating system, a user interface, an application program, and the like. The modem mainly processes wireless communication. It may be understood that the foregoing modem may also not be integrated into the processor 680.

The mobile terminal 600 further includes the power supply 690 (such as a battery) for supplying power to the components. Preferably, the power supply may be logically connected to the processor 680 by using a power management system, thereby implementing functions such as charging, discharging and power consumption management by using the power management system. The power supply 690 may further include one or more of a direct current or alternating current power supply, a re-charging system, a power failure detection circuit, a power supply converter or inverter, a power supply state indicator, and any other components.

Although not shown in the figure, the mobile terminal 600 may further include a camera, a Bluetooth module, and the like, which are not further described herein.

The mobile terminal 600 further includes a memory and one or more programs. The one or more programs are stored in the memory and configured to execute the bullet screen posting methods in the foregoing embodiments by executing the foregoing programs by one or more processors.

In an exemplary embodiment, a non-temporary computer readable storage medium including an instruction is further provided, where non-temporary computer readable storage medium including an instruction is, for example, a memory including an instruction. The instruction may be executed by the processor of the mobile terminal to complete the foregoing bullet screen posting method. For example, the non-temporary computer readable storage medium may be a ROM, a RAM, a CD-ROM, a magnetic tape, a floppy disk, and an optical data storage device.

It should be noted that the above functional modules are only described for exemplary purposes when the bullet screen posting apparatus provided in the foregoing embodiments posts a bullet screen. In actual applications, the functions may be allocated to different functional modules according to specific needs, which means that the internal structure of the apparatus is divided to different functional modules to complete all or some of the functions described above. In addition, the bullet screen posting apparatus provided in the foregoing embodiments are based on the same concept as the bullet screen posting method in the method embodiments. For the specific implementation process, refer to the method embodiments, and the details are not described herein again.

The sequence numbers of the foregoing embodiments of the present disclosure are merely for the convenience of description, and do not imply the preference among the embodiments.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, an optical disc, or the like.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A bullet screen posting method, the method comprising:
displaying a voice input button on a playing interface during a process of playing a video on the same playing interface by a video playing application;
receiving, by the video playing application, a press-and-hold signal acting on the voice input button;
collecting, by the video playing application, voice information by using a microphone of a computing device running the video playing application within duration of the press-and-hold signal;
invoking, by the video playing application, a voice conversion module;
automatically converting the voice information into text information by using the voice conversion module based on a first voice-to-text conversion rule;
presenting, by the video playing application, the text information in a form of a floating window on the playing interface when the video is playing on the same playing interface;
receiving, by the video playing application, a confirmation signal for confirming posting of the text information as the bullet screen information; and
sending, by the video playing application, a bullet screen posting request to a background server, the bullet screen posting request carrying the text information, and the bullet screen posting request being used for requesting the background server to post bullet screen information of the video according to the text information,
wherein the method further comprises:
during a process of receiving the press-and-hold signal and before converting the voice information collected within the duration of the press-and-hold signal into text information, playing, by the video playing application, the video excluding audio information of the video;
presenting a correction icon together with the text information in the floating window on the playing interface;
receiving, by the video playing application, a correction request used for correcting the text information in response to the correction icon being selected;
invoking, by the video playing application, the voice conversion module again in response to the correction request, and automatically converting the voice information into an updated text information by using the voice conversion module based on a second voice-to-text conversion rule, the second voice-to-text conversion rule being different from the first voice-to-text conversion rule; and replacing, by the video playing application, the presented text information with the updated text information obtained based on the second voice-to-text conversion rule.

2. The method according to claim 1, wherein the receiving, by the video playing application, a confirmation signal for confirming posting of the text information as the bullet screen information comprises:

receiving, by the video playing application, a voice confirmation instruction; or, presenting, by the video playing application, a confirmation option for confirming posting of the text information at the same time when the video playing application presents the text information; and receiving, by the video playing application, a selection signal for selecting the confirmation option.

3. The method according to claim 1, wherein the presenting, by the video playing application, the text information in a form of a floating window on the playing interface comprises:

presenting, by the video playing application, the text information in a form of a floating window in a preset region of the playing interface, where the preset region is at least one of the bottom of the playing interface, the top of the playing interface, a left side of the playing interface, a right side of the playing interface, and a central region of the playing interface.

4. The method according to claim 1, wherein the method further comprises:

pausing, by the video playing application, playing of the video within duration of the press-and-hold signal.

5. The method according to claim 1, wherein the sending, by the video playing application, a bullet screen posting request to a background server comprises:

obtaining, by the video playing application, a playing progress of the video; and sending, by the video playing application, the bullet screen posting request carrying the playing progress and the text information to the background server, where the bullet screen posting request is used for requesting the background server to post the bullet screen information of the video according to the playing progress and the text information.

6. A mobile terminal, a video playing application running on the mobile terminal, the mobile terminal comprising:

one or more processors; and a memory, the memory storing one or more programs, the one or more programs being configured to be executed by the one or more processor, and the one or more programs comprising an instruction used for performing the following operations:

displaying a voice input button on a playing interface during a process of playing a video on the same playing interface by the video playing application;

receiving a press-and-hold signal acting on the voice input button;

collecting voice information by using a microphone within duration of the press-and-hold signal;

invoking a voice conversion module;

automatically converting the voice information into text information by using the voice conversion module based on a first voice-to-text conversion rule;

presenting the text information in a form of a floating window on the playing interface when the video is playing on the same playing interface;

receiving a confirmation signal for confirming posting of the text information as the bullet screen information; and sending a bullet screen posting request to a background server, the bullet screen posting request carrying the text information, and the bullet screen posting request being used for requesting the background server to post bullet screen information of the video according to the text information, wherein the one or more programs further comprise an instruction used for performing the following operations:

during a process of receiving the press-and-hold signal and before converting the voice information collected within the duration of the press-and-hold signal into text information, playing, by the video playing application, the video excluding audio information of the video;

presenting a correction icon together with the text information in the floating window on the playing interface;

receiving a correction request used for correcting the text information in response to the correction icon being selected;

invoking, by the video playing application, the voice conversion module again in response to the correction request, and automatically converting the voice information into an updated text information by using the voice conversion module based on a second voice-to-text conversion rule, the second voice-to-text conversion rule being different from the first voice-to-text conversion rule; and replacing, by the video playing application, the presented text information with the updated text information obtained based on the second voice-to-text conversion rule.

7. The method according to claim 1, wherein content blocked by the floating window in the playing interface is in a state that the content cannot be triggered.

8. The method according to claim 1, wherein the floating window overlays the video currently being played on the playing interface.

9. The mobile terminal according to claim 6, wherein the one or more programs further comprise an instruction used for performing the following operations:

receiving a voice confirmation instruction;

or, presenting a confirmation option for confirming posting of the text information at the same time when the text information is presented; and receiving a selection signal for selecting the confirmation option.

10. The mobile terminal according to claim 6, wherein the one or more programs further comprise an instruction used for performing the following operations:

presenting the text information in a form of a floating window in a preset region of the playing interface, where the preset region is at least one of the bottom of the playing interface, the top of the playing interface, a left side of the playing interface, a right side of the playing interface, and a central region of the playing interface.

11. The mobile terminal according to claim 6, wherein the one or more programs further comprise an instruction used for performing the following operations:

pausing playing of the video within duration of the press-and-hold signal.

12. The mobile terminal according to claim 6, wherein the one or more programs further comprise an instruction used for performing the following operations:

obtaining a playing progress of the video; and sending the bullet screen posting request carrying the playing progress and the text information to the background server, where the bullet screen posting request is used for requesting the background server to post the bullet screen information of the video according to the playing progress and the text information.

13. A non-transitory computer-readable storage medium storing computer program instructions executable by at least one processor to perform:

displaying a voice input button on a playing interface during a process of playing a video on the same playing interface by a video playing application;

receiving, by the video playing application, a press-and-hold signal acting on the voice input button;

collecting, by the video playing application, voice information by using a microphone of a computing device running the video playing application within duration of the press-and-hold signal;

invoking, by the video playing application, a voice conversion module;

converting the voice information into text information by using the voice conversion module;

presenting, by the video playing application, the text information in a form of a floating window on the playing interface when the video is playing on the same playing interface;

receiving, by the video playing application, a confirmation signal for confirming posting of the text information as the bullet screen information; and sending, by the video playing application, a bullet screen posting request to a background server, the bullet screen posting request carrying the text information, and the bullet screen posting request being used for requesting the background server to post bullet screen information of the video according to the text information, wherein the computer program instructions further cause the at least one processor to perform:

during a process of receiving the press-and-hold signal and before converting the voice information collected within the duration of the press-and-hold signal into text information, playing, by the video playing application, the video excluding audio information of the video;

presenting a correction icon together with the text information in the floating window on the playing interface;

receiving, by the video playing application, a correction request used for correcting the text information in response to the correction icon being selected;

invoking, by the video playing application, the voice conversion module again in response to the correction request, and automatically converting the voice information into an updated text information by using the voice conversion module based on a second voice-to-text conversion rule, the second voice-to-text conversion rule being different from the first voice-to-text conversion rule; and replacing, by the video playing application, the presented text information with the updated text information obtained based on the second voice-to-text conversion rule.

14. The storage medium according to claim 13, wherein the receiving, by the video playing application, a confirmation signal for confirming posting of the text information as the bullet screen information comprises:

receiving, by the video playing application, a voice confirmation instruction; or, presenting, by the video playing application, a confirmation option for confirming posting of the text information at the same time when the video playing application presents the text information; and receiving, by the video playing application, a selection signal for selecting the confirmation option.

15. The storage medium according to claim 13, wherein the presenting, by the video playing application, the text information in a form of a floating window on the playing interface comprises:

presenting, by the video playing application, the text information in a form of a floating window in a preset region of the playing interface, where the preset region is at least one of the bottom of the playing interface, the top of the playing interface, a left side of the playing interface, a right side of the playing interface, and a central region of the playing interface.

16. The storage medium according to claim 13, wherein the computer program instructions further cause the at least one processor to perform:

pausing, by the video playing application, playing of the video within duration of the press-and-hold signal.

17. The storage medium according to claim 13, wherein the sending, by the video playing application, a bullet screen posting request to a background server comprises:

obtaining, by the video playing application, a playing progress of the video; and sending, by the video playing application, the bullet screen posting request carrying the playing progress and the text information to the background server, where the bullet screen posting request is used for requesting the background server to post the bullet screen information of the video according to the playing progress and the text information.

\* \* \* \* \*